May 28, 1935. H. R. ISLER 2,002,816
MACHINE TOOL DRIVE
Filed April 5, 1933. 4 Sheets-Sheet 1
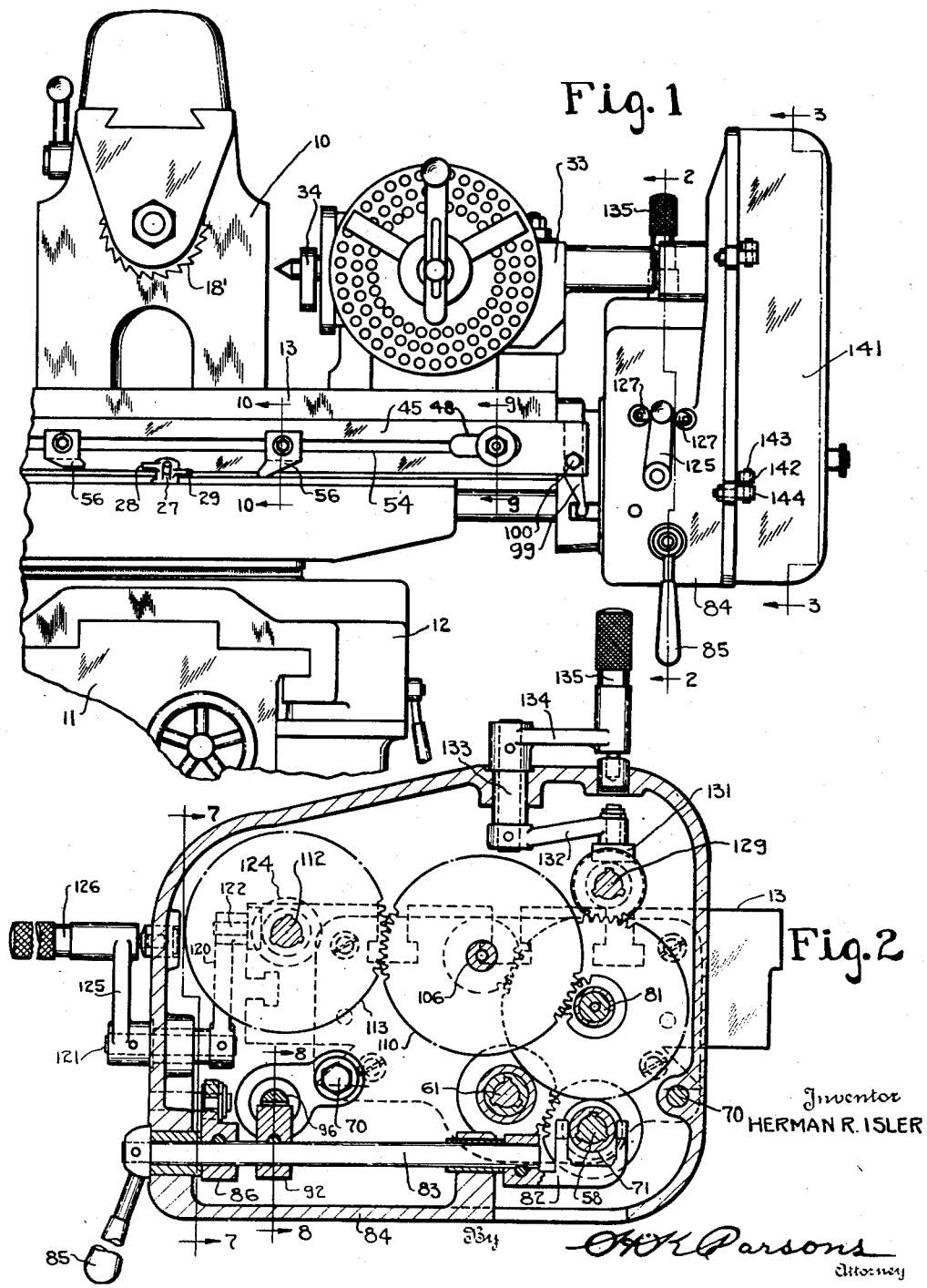

May 28, 1935.  H. R. ISLER  2,002,816
MACHINE TOOL DRIVE
Filed April 5, 1933   4 Sheets-Sheet 2

Inventor
HERMAN R. ISLER

By HK Parsons
Attorney

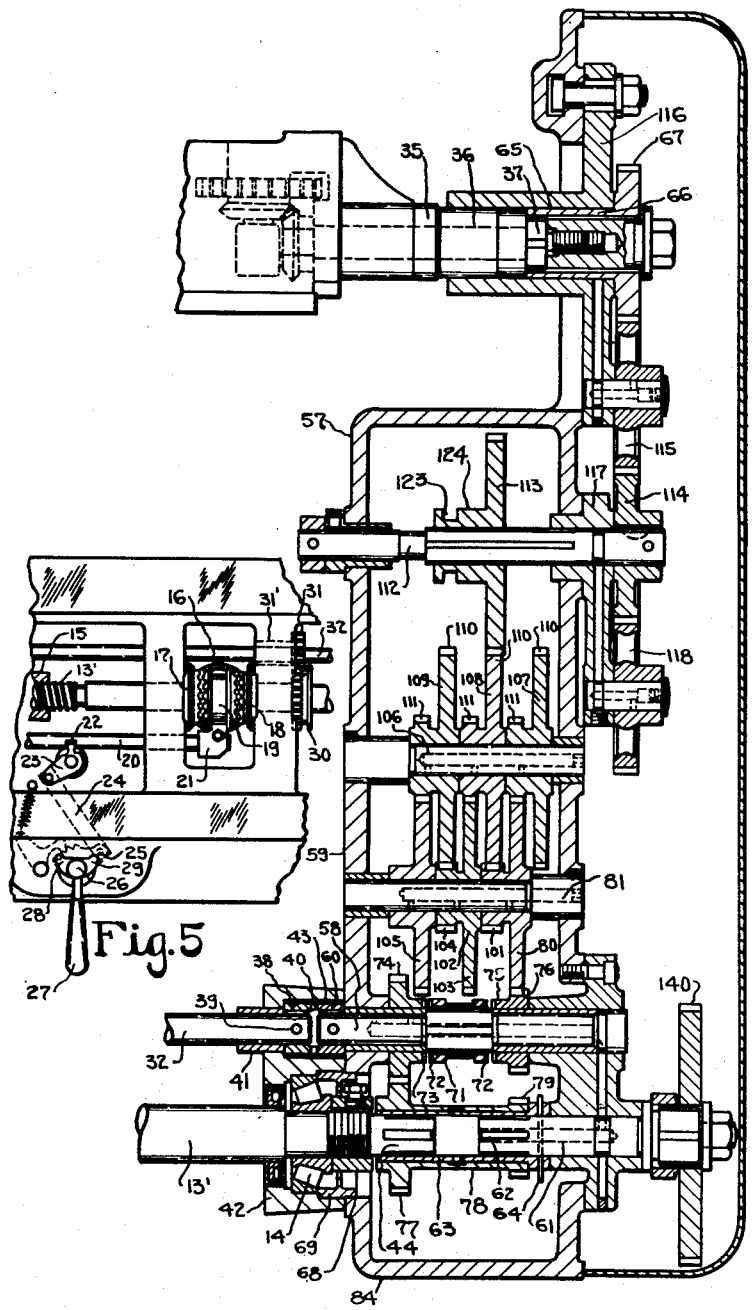

Inventor
HERMAN R. ISLER

Patented May 28, 1935

2,002,816

UNITED STATES PATENT OFFICE 2,002,816

MACHINE TOOL DRIVE

Herman R. Isler, Norwood, Ohio, assignor to The Cincinnati Milling Machine Company, Cincinnati, Ohio, a corporation of Ohio Application April 5, 1933, Serial No. 664,579

12 Claims.  (Cl. 90—20)

This invention relates to milling machines and more particularly to an improved mechanism for effecting relative movement between a cutter and work along a spiral path.

In cutting or forming spiral grooves on a milling machine, it is necessary to cause relative movement between the cutter and work in a spiral path, the pitch of which is determined by the relation between the rate of rotary movement between the cutter and work, and the rate of relative bodily translation along a rectilinear path. For small pitches in which the spiral lies in a plane that is almost perpendicular to the axis of the work, the rate of linear travel of the rotary movement must be greater than the rate of linear travel of the rectilinear movement, and, contra, for large pitches the rate of linear travel of the rotary movement must be less than the rate of the rectilinear movement. From this it will be evident that if a predetermined rate were maintained for one of said movements, the rate of the other movement would be excessively high in the one case and excessively low in the other case, resulting in an impossible cutting speed in one instance and an uneconomically slow cutting speed in the other instance.

It is an object of this invention to provide a mechanism for effecting relative movement between a cutter and work along various spiral paths at economical cutting rates regardless of the angle of the spiral.

Another object of this invention is to provide a drive mechanism for simultaneously actuating a table and an attachment mounted thereon which is adjustable in such manner that the relative rates of actuation of the parts may be complementally varied and in such progressive steps as to include a relatively large number of possible spiral leads but with a minimum of mechanism and control parts.

Another object of this invention is to provide an improved machine tool drive for effecting spiral feed movement between the cutter and work in which the lead may be easily and quickly changed through small successive steps.

A further object of this invention is to provide an improved detachable spiral dividing head driving gear box for milling machine tables which may be easily and quickly applied or removed and in which the control of all the parts are centralized in said box.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 1 is a front elevation of one form of the invention.

Figure 2 is a section on the line 2—2 of Figure 1.

Figure 4 is an expanded view of the transmission mechanism for the dividing head.

Figure 5 is a detailed plan view showing a conventional table transmission and control mechanism.

Figure 3:
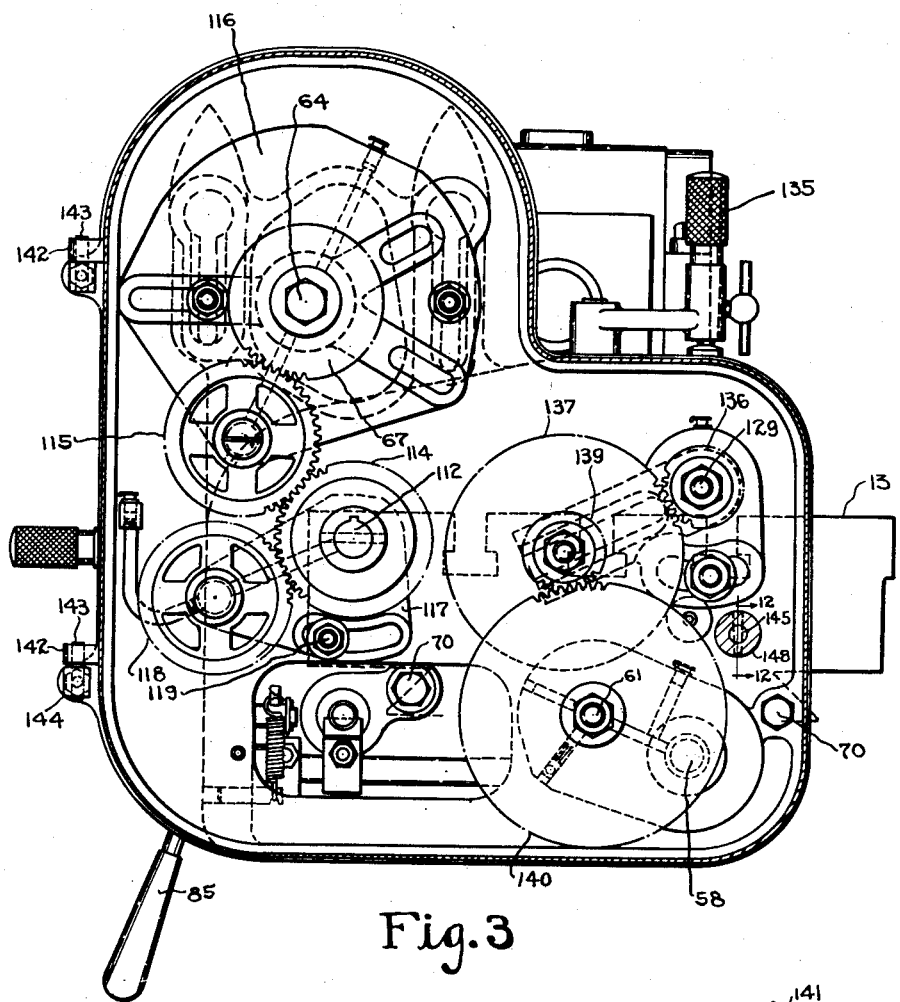
Figure 3 is a section on the line 3—3 of Figure 1.

A conventional milling machine structure such as one of the knee and column type has been shown in Figure 1 for the purpose of illustrating this invention and the reference numeral 10 indicates the column of such machine having slidably mounted thereon for vertical adjustment a knee 11, which in turn supports a saddle 12 for cross movement toward and from the column. A table 13 is reciprocably mounted in guideways formed in the saddle for transverse movement. The mechanism for effecting translation of the table is supported in this machine in the saddle, as shown in Figure 5, and comprises a lead screw 13' which is rotatably journaled in opposite ends of the table, preferably by anti-friction bearings, such as 14, shown in Figure 4. A nut 15 is fixed in the saddle through which the lead screw passes so that upon rotation thereof either by manual or power means, the table will move relative to the saddle.

The power means for normally effecting rotation of the lead screw may be a conventional structure comprising bevel gear 16 meshing with a pair of bevel gears 17 and 18 arranged in such relation that they will be co-axial with the lead screw but rotatable in opposite directions. The faces of the bevel gears 17 and 18 may be provided with clutch teeth for selective engagement with a shiftable clutch member 19 splined to the lead screw. A shifter rod 20 is slidably mounted in the saddle having a shifter fork 21 upon one end engaging an annular groove formed in the clutch member. A socket 22 is formed in rod 20 for receiving the ball-end of crank lever 23. A connecting rod 24 couples this lever to a lug 25 formed integral with a pivoted shaft 26 mounted in the saddle adjacent to the front edge of the table. This shaft has a manual operating handle 27 and a pair of lugs 28 and 29 projecting from opposite sides thereof for selective engagement with dogs carried by the table for automatic operation. By means of this conventional structure the clutch may be shifted to any one of three positions and as is usual suitable detent mechanism is present for maintaining the clutch in any position.

The bevel gears 17 and 18 as shown in Figure 5 are journaled in the saddle against longitudinal movement and when power is applied to bevel gear 16, the gears 17 and 18 are constantly rotated. Advantage is taken of this by providing a spur gear 30 on the opposite end of the hub of bevel gear 18 which may be utilized for effecting relative spiral movement between a cutter 18' and work piece supported by a spiral dividing head mounted on the table unaffected by the reverser clutch. To this end a second spur gear 31 having a hub 31' is also journaled in the saddle and fixed therein against longitudinal movement for constant actuation by the gear 30. The hub of gear 31 has a splined bore therein for receiving a re- A detachable gear box has been provided which may be mounted on the end of the table and thereby automatically interconnect the spiral head and the lead screw to the shaft for joint actuation. An adjustable transmission mechanism has been provided in the box for varying the relative rates of actuation of the dividing head and lead screw so that the direction or lead of the spiral cutting path may be varied.

Figure 9:
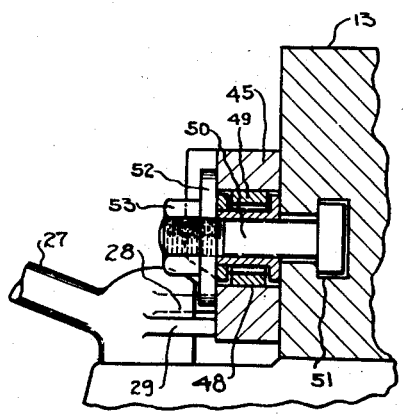
Figure 9 is a section on the line 9—9 of Figure 1.
Figure 10:
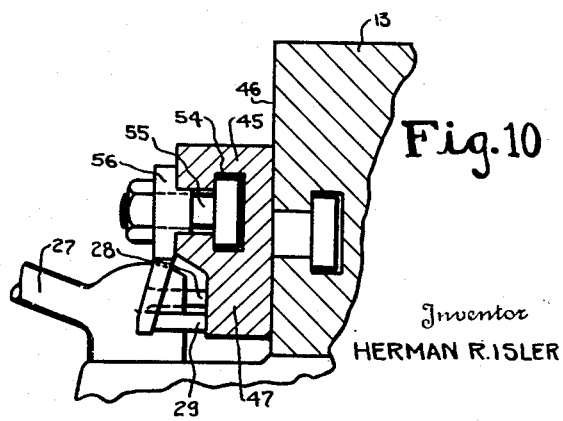
Figure 10 is a section on the line 10—10 of Figure 1.

The lead screw 13' receives its power or is driven from the gear box so that all control may be centralized at the gear box and for this reason the reversing clutch 19 is not utilized during spiral cutting operations. To prevent damage, however, it is necessary to lock the clutch positively in a neutral position, otherwise the screw might be driven from two different sources and at different rates. To this end a locking bar 45 is mounted on the front face 46 of the table 13 and this bar has a portion 47, Figure 10, which is of proper thickness to engage simultaneously the end of lugs 28 and 29 and move the clutch 19 to a neutral position thereby preventing operation of the handle 27 by the operator and inadvertent engagement of the clutch. The bar is provided at opposite ends with elongated slots 48, Figures 1 and 9, in which is mounted anti-friction rollers 49 supported by T-bolts 50. These bolts are mounted in the ordinary T-slots 51 usually found in the front edge of the work table. A lock washer 52 and nut 53 are mounted on the end of the bolt for securing the bearing to the table, the bearing in turn supporting the lock bar. It will be noted from Figure 1 that the slots 48 are not very long but they are of sufficient length to permit longitudinal movement of the bar relative to the table. This is for the reason that the bar itself is provided with a T-slot The face 59 of the attachment has a counterbore 68 formed therein for receiving the tubular end 69 of bearing 14 for centering the attachment with respect to the lead screw. After the parts are mounted in position so that the shaft 38 is automatically connected to the shaft 58 and the lead screw 13' is automatically connected to shaft 61, a pair of bolts 70, Figures 2 and 3, are screwed into the apron for securing the parts to the table.

Figure 11:
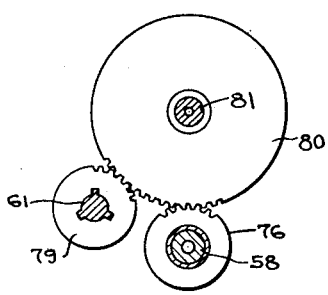
Figure 11 is a detail view of part of the gearing.

Since the reversing clutch 19 is rendered inoperative by the lock bar 50, means have been provided in the attachment for simultaneously reversing the direction of movement of the dividing head and the table. To this end the shaft 58 has splined thereto the shiftable clutch member 71 having clutch teeth 72 on opposite ends thereof for selective engagement with clutch teeth 73 formed on the hub of spur gear 74 or clutch teeth 75 formed on the hub of spur gear 76. The spur gear 74 meshes with gear 77 of the couplet 78 mounted for free rotation on the sleeve 63. The other gear 79 of the couplet 78 is connected to gear 76 through gear 80 mounted on shaft 81 as more particularly shown in Figure 11. From this is will be seen that when the clutch member 71 is shifted to the extreme right as viewed in Figure 4, the shaft 32 will be connected direct to gear 80 through gear 76 and when the clutch is shifted to the extreme left, the drive will then go through inter-meshing gears 74—77, and gear 70 to gear 80. This will cause the gear 80 to rotate in a direction opposite to that determined by the gear 76.

Figure 7:
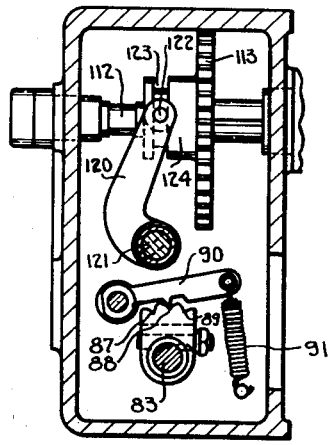
Figure 7 is an elevational view along the line 7—7 of Figure 2.

The clutch 71 is shifted by a fork 82, Figure 2, keyed to the end of oscillatable shaft 83 which extends through the end of the housing 84 where it is provided with an operating handle 85. The shaft 83 also has secured thereto a collar 86 which, as shown in Figure 7, is provided with three indents 87, 88 and 89 which cooperate with the pivoted detent 90 held in engagement with the periphery of the collar by a spring 91. The middle detent 89 serves to hold the clutch in a neutral position, while the other detents maintain the clutch in either one of its power transmitting positions.

Figure 8:
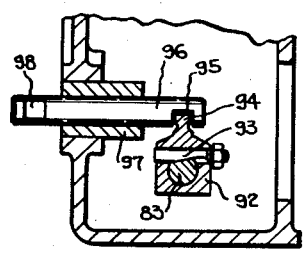
Figure 8 is a detail section on the line 8—8 of Figure 2.

The clutch 71 is automatically actuated by means of the following mechanism. A second collar 92 is secured to the shaft 83 as shown in Figure 8 by the lock bolt 93 and this collar has a projecting lug 94 engaging a socket 95 formed in the reciprocable rod 96 which is mounted in the bushing 97 fixed with the housing. The rod 96 has a pair of slots 98 formed in opposite sides thereof for receiving a bifurcated member 99, Figure 1, secured to the end of the lock bar by a bolt 100. The operation is as follows: When the clutch is manually moved to either operating position by the handle 85, the table will feed until one of the dogs 56 engages the member 26 whereby the dog 56, bar 45, the forked member 99 and the rod 56 will be held stationary while the table and housing 84 and thereby the shaft 83 and collar 92 will move relative thereto causing rotation of shaft 83 and finally movement of clutch 71 to a neutral position to stop the table.

The gear 80 in Figure 4 drives a variable speed transmission for the spiral head comprising the following: The gear 80 is part of a gear couplet, the other member of which is the gear 101. A similar gear couplet 102 comprising gears 103 and 104 is mounted on the shaft 81 and these gears have the same pitch and number of teeth respectively as the gears 80 and 101. An additional gear 105 is also mounted in the shaft 81 and has the same number of teeth as the gear 103. A shaft 106 parallel to shaft 81 is provided with three couplets 107, 108 and 109, each couplet having a large gear 110 of the same pitch and number of teeth; and a small gear 111 having the same pitch and number of teeth. The large gears 80, 103 and 105 mounted on shaft 81 mesh with the small gears 111 of the couplets mounted on the shaft 106, and the small gears 101 and 104 mounted on shaft 81 mesh with the large gears 110 mounted on shaft 106. The drive, however, is in the following manner.

The gear 80 drives the couplet 107 through intermeshing with the gear 111 and attention is invited to the fact that the gear 111 and the gear 76 are of the same pitch and number of teeth so that the ratio between shaft 58 and shaft 106 is one to one through this train of gears. In other words, the large gear 110 of couplet 107 makes one revolution for each revolution of shaft 32. The small gear 101 meshes with the larger gear 110 of couplet 108 and the gears 76 and 80 are in the ratio of two to five, and the gears 101 and 110 are in the ratio of one to four so that the ratio through this particular gear train between shaft 106 and shaft 58 is a one to ten reduction. The gear 111 of couplet 108 meshes with the gear 103 of couplet 102 and the ratio between these gears is two to five, while the gear 104 of couplet 102 meshes with large gear 110 of couplet 109 and the ratio between these gears is one to four so that the reduction through the gear train comprising these two paths is one to ten, and since this train is driven through the previously described train having a ratio of one to ten, it will be seen that the final reduction ratio between the shaft 106 and drive shaft 32 is one to one-hundred. We thus have three gears 110, which are arranged in a geometrical progression of one to ten to one-hundred, the gear 110 of couplet 107 being in a one to one ratio with shaft 32, the gear 110 of couplet 108 being in one to ten ratio with shaft 32, and the gear 110 of couplet 109 being in one to one-hundred ratio with shaft 32.

A splined shaft 112 is journaled in the bracket 57 and has slidably mounted thereon the shiftable gear 113 which is of the same pitch and has the same number of teeth as the gears 110 so that irrespective of which gear it meshes with, the preceding ratios are not disturbed. Therefore, the shaft 112 may be coupled in a one to one; one to ten; or one to one-hundred ratio with shaft 32. A spur gear 114 is keyed or otherwise connected to shaft 113 and is adapted to be connected to gear 67 through an idler 115 mounted on the pivoted bracket 116. This bracket is adapted to swing about the axis of shaft 36 so as to move the gear 115 into mesh with gears 114 and 67. All of these gears are of the same pitch and have the same number of teeth so that the preceding ratios mentioned are not disturbed.

A second bracket 117 is pivotally mounted in housing 57 for movement about the axis of shaft 12, and carries an additional gear 118 of the same pitch and number of teeth as gear 114 and adapted to be swung into mesh between gears 114 and 115 for effecting rotation of the attachment in a direction opposite relatively to the table lead screw. A locking bolt 119, Figure 3, serves to secure the bracket 117 in any adjusted position. The gear 113 is shifted by the following mechanism.

A shifter arm 120, Figure 2, is pivotally mounted on shaft 121 and has a pivoted shoe 122 in the free end thereof engaging a groove 123 formed in the hub 124 of gear 113. The shaft 121 extends through the housing and provided with an operating handle 125 as shown in Figures 1 and 2, the operating handle having a spring pressed plunger 126 in the end thereof for engagement with a plurality of socket 127 formed on the exterior of the housing for maintaining the clutch in any one of three positions. It will thus be seen that a variable speed transmission has been interposed between the power shaft 32 and the dividing head which has a shiftable member for coupling the parts together in three different ratios arranged in geometrical progression. Also in this drive is a reverser mechanism whereby the attachment may be operated in either direction for the same direction of movement of the table.

Figure 6:
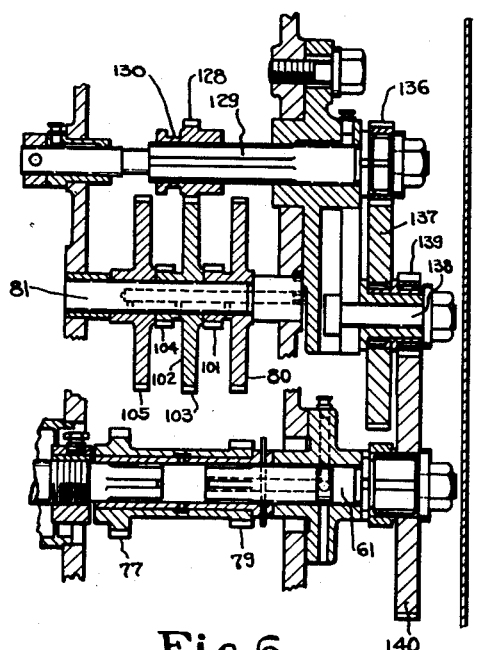
Figure 6 is an expanded view showing the transmission mechanism for the table.

The drive to the table is selectively connected to the alternate gears 80, 103 and 105 of the previously described gear train and this is effected by a shiftable gear 128 slidably mounted on the splined shaft 129 as shown in Figure 6. This gear has an annular groove 130 formed in the hub thereof to which is fitted a shoe 131 pivotally mounted to the end of lever 132 fixed to shaft 133. This shaft extends through the top of the housing as shown in Figure 2 where it is provided with an operating handle 134 having a spring pressed plunger 135 reciprocably mounted in the end thereof for engagement with detents formed in the top of the housing similar to the detents 127 for shift lever 125. The splined shaft 129 has secured to the outer end thereof the pick-off gear 136 which meshes with gear 137 mounted on the adjustable stud shaft 138. An additional gear 139 is mounted thereon in mesh with a gear 140 which is keyed to the end of shaft 61.

Attention is invited to the fact that the gear 76 and gear 128 are of the same pitch and number of teeth and therefore when the gear 128 meshes with gear 80 the shaft 129 will be in a one-to-one ratio with shaft 32. Since as previously described, the train from gear 80 to 103 makes a one-to-ten reduction, and from 103 to 105 a second one-to-ten reduction, or in other words a total of one to one-hundred reduction, it will be seen that the shaft 129 may be coupled by this mechanism to the drive shaft 32 in either a one-to-one ratio, or a one-to-ten reduction, or a one-to one-hundred reduction. The pick-off gears 136, 137, 139 and 140 may be inter-changed to provide any number of intermediate reductions between the major reductions effected by the shifting of gear 128. The number may vary by the number of different toothed wheels that it is desired to substitute for the gears shown, and will amount to hundreds of different combinations. Attention is invited to the fact, however, that the clearance space around gear 136 prevents the use of gears much larger than that shown so that the ratio between shaft 129 and shaft 61 will always be a reduction ratio. It will be apparent that whatever the number of gear changes provided by the pick-off gears that this number will be multplied by three in computing the total number of leads possible to produce in the table and in addition there will be three positions of gear 113 relative to the attachment.

Figure 12:
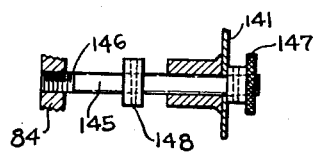
Figure 12 is a section through the cover lock bolt as viewed on the line 12—12 of Figure 3.

A hinged cover 141 may be mounted on the box to permit ready access to the pick-off gears. If the cover is made of sheet metal, hinge lugs 142 may be welded thereon having pins 143 fitted in drilled holes formed in lugs 144 projecting from the housing 84. A lock bolt 145 as shown in Figure 12 may be provided with a threaded end 146 for engaging a threaded hole formed in the housing 84. A knurled collar 147 is pinned to the end of the bolt to facilitate rotation thereof. An additional collar 148 may be pinned to the bolt on the inside of the cover to prevent the same from coming out and being lost.

The advantage of the foregoing decimal system change speed gear mechanism when computing the lead of the table screw will now be explained. In prior structures where a large number of different gear pairs are used to drive the attachment and table screw, it is necessary to multiply together the ratios of each gear pair to arrive at the lead of the table screw. In the present arrangement the change gear mechanism extending from shaft 129 to shaft 161 is used as the basis of all computations. And since this change speed mechanism only includes two gear pairs, it only becomes necessary to multiply the ratio of these two pairs together assuming that shiftable gear 113 is meshing with gear 107 and shiftable gear 108 is meshing with gear 80. With this ratio as a basis any major decrease therein may be effected by shifting gear 128 into mesh with gear 103 and moving the decimal point of the result one place to the left; or into mesh with gear 105 and moving the decimal point two places to the left because the reduction ratio of these gears is one to ten and one to a hundred respectively. If it is desired to increase the ratio while maintaining gear 128 in mesh with gear 108, the gear 113 is shifted into mesh with gear 108 causing the decimal point to be moved one place to the right; or into mesh with gear 109 when the decimal point is moved two places to the right. It will thus be seen that having computed the leads for the fundamental rate change mechanism that major changes up or down are effected easily and quickly by shifting either gear 128 or gear 113 and correspondingly changing the decimal point in the result.

Another advantage of this construction is that these same gears may be utilized to change the feed rate without disturbing the existing ratio between the attachment and lead screw or in other words while maintaining the same lead. This is effected by shifting simultaneously both shiftable gears 128 and 113 in the same direction and the same number of steps which results in the rate being increased or decreased by the factor 10. For example, if gears 128 and 113 mesh respectively with gears 103 and 108, a certain ratio exists between attachment and lead screw resulting in a certain lead. The feed rate of the table may however, be too high or too low. If too high, both gears 128 and 113 are shifted to the left, thereby reducing the feed rate by the factor ten without disturbing the lead. This is because shifting gear 128 reduced the lead by the factor 10 and shifting gear 113 increased the lead by the factor 10 resulting in one cancelling the other. But each gear in its new position is driven at a rate which is reduced by the factor 10 so that both table and attachment operate at a slower speed. Likewise it will be seen that shifting the gears 128 and 113 to the right into mesh with gears 80 and 107 will increase the feed rate by the factor 10 without disturbing the lead.

An improved machine tool drive has therefore been provided for a milling machine in which an attachment and the table may be simultaneously actuated from a common power shaft and in an innumerable number of various combinations to produce long or short leads which will progressively vary from fine threads to long spiral leads extending nearly parallel to the axis of work and in which the rate of movement of one element may be complementarily varied with respect to the rate of the other movement so that economical cutting speeds may be obtained regardless of the pitch of the spiral.

What is claimed is:

1. In a milling machine having a support, a tool spindle journaled in the support, a work table mounted on the support for movement transversely of the spindle and means for normally effecting translation of the table including a lead screw, a constantly driven power shaft and a reverser mechanism for coupling the lead screw to the power shaft, said reverser mechanism including a control lever having a neutral position and a power transmitting position on either side thereof, the combination of means for effecting a relative spiral movement between the tool and a work piece comprising a spiral dividing head mounted on the table for supporting the work piece for rotary movement, a splined shaft carried by the table and constantly driven by said power shaft, a gear box detachably mounted on the end of the table containing branch transmissions extending respectively to the spiral head and the lead screw, a shiftable clutch member for connecting said branch transmissions to the splined shaft for actuation thereby, means detachably mounted on the table for locking said control lever in a neutral position including a slidable bar, means connecting the bar to said clutch member and trip dogs mounted on the bar for engagement with said fixed control lever to effect shifting of the bar and connected clutch to terminate the spiral movement.

2. In a milling machine having a support, a tool spindle journaled in the support, a work table mounted on the support for movement transversely of the spindle and means for normally effecting translation of the table including a lead screw, a constantly driven power shaft and a reverser mechanism for coupling the lead screw to the power shaft, said reverser mechanism including a control lever having a neutral position and a power transmitting position on either side thereof, the combination of means for effecting a relative spiral movement between the tool and a work piece comprising a spiral dividing head mounted on the table for supporting the work piece for rotary movement, a splined shaft carried by the table and constantly driven by said power shaft, a gear box detachably mounted on the end of the table containing branch transmissions extending respectively to the spiral head and the lead screw, a shiftable clutch member for connecting said branch transmissions to the splined shaft for actuation thereby, means detachably mounted on the table for locking said control lever in a neutral position including a slidable bar, means connecting the bar to said clutch member, trip dogs mounted on the bar for engagement with said fixed control lever to effect shifting of the bar and connected clutch to terminate the spiral movement, and manually operable means for shifting said clutch member to reconnect the branch transmissions to the splined shaft.

3. In a milling machine the combination of a cutter spindle, a work spindle, a table for supporting one of said spindles for relative movement with respect to the other, a power train terminating in a pair of continuously oppositely rotatable elements, a shaft adapted to be detachably mounted in the table for rotation, means operatively connecting the shaft automatically with one of said elements upon installation whereby the shaft will be continuously uni-directionally rotated, a pair of rotors for actuating the table and the spindle supported thereby, means for simultaneously connecting said rotors for opposite rotation by said shaft, including a control clutch, and means between the clutch and rotors for reducing the speed of either one with respect to the other whereby in cutting short leads the work spindle may be rotated at a faster linear rate than the table and in cutting long leads the table may be moved at a faster linear rate than the work spindle is rotated.

4. In a milling machine the combination of a cutter spindle, a work spindle, a table for supporting one of said spindles for relative movement with respect to the other, a power train terminating in a pair of continuously oppositely rotatable elements, a shaft adapted to be detachably mounted in the table for rotation, means operatively connecting the shaft automatically with one of said elements upon installation whereby the shaft will be continuously uni-directionally rotated, a pair of rotors for actuating the table and the spindle supported thereby, means for simultaneously connecting said rotors for opposite rotation by said shaft, including a reverser and individual branch transmissions each having a rate change mechanism including individual primary members driven at the same rate, means to make predetermined stepped reductions in geometric progression in each branch transmission to approximate the relative rate of movement between said spindles and additional means in one of said branch transmissions to establish an additional number of rates, ranging between each pair of steps of the respective transmission.

5. In a milling machine the combination of a cutter spindle, a work spindle, a table for supporting one of said spindles for relative movement with respect to the other, a power train terminating in a pair of continuously oppositely rotatable elements, a shaft adapted to be detachably mounted in the table for rotation, means operatively connecting the shaft automatically with one of said elements upon installation whereby the shaft will be continuously uni-directionally rotated, a pair of rotors for actuating the table and the spindle supported thereby, means for simultaneously connecting said rotors for opposite rotation by said shaft, including a reverser and individual branch transmissions each having a rate change mechanism including individual primary members driven at the same rate, means to make predetermined stepped reductions in geometric progression in each branch transmission to approximate the relative rate of movement between said spindles, additional means in one of said branch transmissions to establish an additional number of rates, ranging between each pair of steps of the respective transmission, and trip actuable means carried by the table for automatically shifting the reverser to a neutral position.

6. In a milling machine the combination of a cutter spindle, a work spindle, a table for supporting one of said spindles for relative movement with respect to the other, a power train terminating in a pair of continuously oppositely rotatable elements, a shaft adapted to be detachably mounted in the table for rotation, means operatively connecting the shaft automatically with one of said elements upon installation whereby the shaft will be continuously uni-directionally rotated, a pair of rotors for actuating the table and the spindle supported thereby, means for simultaneously connecting said rotors for opposite rotation by said shaft, including a reverser and individual branch transmissions each having a rate change mechanism including individual primary members driven at the same rate, means to make predetermined stepped reductions in geometric progression in each branch transmission to approximate the relative rate of movement between said spindles, additional means in one of said branch transmissions to establish an additional number of rates, ranging between each pair of steps of the respective transmission, trip actuable means carried by the table for automatically shifting the reverser to a neutral position, and an additional reverser in one of said branch transmissions for changing the direction of movement of one of said parts relative to the direction of movement of the other.

7. A milling machine having a support, a tool spindle journaled in the support, a work spindle, a table supporting said work spindle for relative bodily movement with respect to said tool spindle, a relatively movable lead screw and nut for reciprocating the table, a power train adapted to be driven at variable rates terminating in oppositely rotatable elements co-axial to the lead screw, a shaft adapted to be detachably supported in the table and automatically connected with one of said elements upon installation of the shaft whereby it will be continuously rotated in one direction, a gear box having rotors adapted to be automatically connected with said shaft and lead screw upon attachment of the gear box to the table, a pair of parallel shafts journaled in said box, each of said shafts having pairs of co-axial gears mounted thereon, motion transmitting means for effecting rotation of one pair of gears by one of said rotors, said parallel shafts being so positioned that the gears on one shaft actuate the alternate gears on the other shaft whereby the gears on said parallel shafts will be driven as a continuous gear train, a shiftable gear adapted to cooperate with the gears on one parallel shaft to effect rotation of the tool spindle, a second shiftable gear adapted to cooperate with the gears on the other of said parallel shafts to operate the rotor connected to the lead screw, individual manual means for positioning each of said shiftable gears, and additional means in one of said branch transmissions for effecting further variations in rate and thus the relative relation between the rate imparted to the work spindle and the rate imparted to the table.

8. A milling machine having a support, a tool spindle journaled in the support, a work spindle, a table supporting said work spindle for relative bodily movement with respect to said tool spindle, a relatively movable lead screw and nut for reciprocating the table, a power train adapted to be driven at variable rates terminating in oppositely rotatable elements co-axial to the lead screw, a shaft adapted to be detachably supported in the table and automatically connected with one of said elements upon installation of the shaft whereby it will be continuously rotated in one direction, a gear box having rotors adapted to be automatically connected with said shaft and lead screw upon attachment of the gear box to the table, a first branch transmission extending from one of said rotors to the tool spindle, a second branch transmission extending from the same rotor to the remaining rotor, means for simultaneously connecting the branch transmissions to their common rotor driver for determining their direction of actuation, and an additional reverser in one of said branch transmissions for changing the relative direction of actuation of the work spindle with respect to the table lead screw.

9. A milling machine having a tool spindle, a work spindle, a table for supporting one of said spindles for relative movement with respect to the other, means for effecting said relative movement and simultaneously rotating the work spindle whereby a spiral cutting path may be generated between the tool spindle and work, a variably driven power train terminating in a constantly actuated rotor, a drive shaft adapted to be detachably connected with said rotor, a first rotatable element for effecting the translation of the table, a second rotatable element for rotating the work spindle, motion transmitting mechanism coupling the driving shaft to said elements including a first shaft connected to said driving shaft in a one to one ratio, a second shaft for driving one of said elements and connectible to the first shaft in a one to one ratio or a plurality of reduction ratios, a third shaft for driving the other element and connectible to the first shaft in a one to one ratio or a plurality of reduction ratios, and means associated with one of said elements to change its direction of rotation relative to the other element.

10. A milling machine having a tool spindle, a work spindle, a table for supporting one of said spindles for relative movement with respect to the other, means for effecting said relative movement and simultaneously rotating the work spindle whereby a spiral cutting path may be generated between the tool spindle and work, a variably driven power train terminating in a constantly actuated rotor, a drive shaft adapted to be detachably connected with said rotor, branch transmissions extending from the drive shaft to the work spindle, and of a table actuator and reverser mechanism for simultaneously coupling said transmissions to the drive shaft, each branch transmission including a shiftable gear, rate change mechanism, individual gear shifting mechanism for each transmission for approximately determining the relative rate of movement between said spindles, and a change gear rate changer in one of said branch transmissions for finally determining said relative rate of movement.

11. A milling machine having a tool spindle, a work spindle, a table for supporting one of said spindles for relative movement with respect to the other, means for effecting said relative movement and simultaneously rotating the work spindle whereby a spiral cutting path may be generated between the tool spindle and work, a variably driven power train terminating in a constantly actuated rotor, a drive shaft adapted to be detachably connected with said rotor, motion transmitting means coupling said drive shaft to a work spindle, and to a table actuator including a fundamental rate change gear mechanism including change gears for determining the lead of the table for one revolution of the work spindle, another change gear mechanism including a member shiftable in one direction to reduce by the factor 10 the lead of the table actuator as determined by the fundamental gear change mechanism, and an additional gear mechanism including a member shiftable in a given direction for increasing by the factor 10 the lead of the table actuator as determined by the first two gear mechanisms.

12. A machine tool having a tool spindle, a reciprocable table, a work spindle carried by the table, an actuator for reciprocating the table to effect relative movement between said spindles to generate a spiral cutting path, a drive shaft rotatably supported by the table, a train connecting said drive shaft to the table actuator, said train including in series a first gear mechanism, a second gear mechanism and a fundamental change gear mechanism, means to adjust the change gear mechanism for determining the lead of the table relative to one revolution of the work spindle, a shiftable member in the first gear mechanism for increasing said lead by the factor 10, a second shiftable member in the second gear mechanism for decreasing the lead by the factor 10 and means to shift both members together in one direction or the other for increasing or decreasing the feed rate without changing the lead of the table.

HERMAN R. ISLER.